(12) United States Patent
Rabinovich

(10) Patent No.: US 7,600,666 B2
(45) Date of Patent: Oct. 13, 2009

(54) REPAIR WITH FEEDSTOCK HAVING CONFORMING SURFACES WITH A SUBSTRATE

(76) Inventor: Joshua E. Rabinovich, 15 Voss Ter., Newton, MA (US) 02159

( * ) Notice: Subject to any disclaimer, the term of this patent is extended or adjusted under 35 U.S.C. 154(b) by 384 days.

(21) Appl. No.: 10/445,024

(22) Filed: May 27, 2003

(65) Prior Publication Data

US 2004/0238508 A1 Dec. 2, 2004

(51) Int. Cl.
*B23K 35/16* (2006.01)
(52) U.S. Cl. .................. 228/125; 228/165; 228/225; 228/246; 228/247
(58) Field of Classification Search ............ 219/121.63, 219/121.64, 121.82, 121.83, 121.85; 228/245–247, 228/249, 250, 165–169, 189
See application file for complete search history.

(56) References Cited

U.S. PATENT DOCUMENTS

| | | | | |
|---|---|---|---|---|
| 729,154 A | * | 5/1903 | Gausden | 76/112 |
| 1,515,692 A | * | 11/1924 | Mattice | 219/106 |
| 1,989,695 A | * | 2/1935 | Jensen | 29/402.11 |
| 2,003,488 A | * | 6/1935 | Hook | 285/289.1 |
| 2,015,074 A | * | 9/1935 | Howland | 445/46 |
| 2,053,216 A | * | 9/1936 | Deming | 228/189 |
| 2,361,106 A | * | 10/1944 | Jensen | 29/402.11 |
| 2,537,533 A | * | 1/1951 | Ingalls | 29/402.16 |
| 2,734,261 A | * | 2/1956 | Stuck | 228/119 |
| 3,132,077 A | * | 5/1964 | Turovlin | 376/450 |
| 3,334,211 A | * | 8/1967 | Wheeler et al. | 219/78.16 |
| 3,396,891 A | * | 8/1968 | De Jong et al. | 226/184 |
| 3,400,358 A | * | 9/1968 | Byrnes et al. | 439/75 |
| 3,487,530 A | * | 1/1970 | Ely | 228/119 |
| 3,541,296 A | * | 11/1970 | Rudd | 219/117.1 |
| 3,585,345 A | * | 6/1971 | Jespersen | 219/83 |
| 3,733,686 A | * | 5/1973 | Maucher | 228/165 |
| 4,110,887 A | * | 9/1978 | Kachik | 228/119 |
| 4,478,425 A | * | 10/1984 | Benko | 280/433 |
| 4,874,136 A | * | 10/1989 | Webster | 241/251 |
| 4,932,583 A | * | 6/1990 | LaCombe | 228/138 |
| 5,090,610 A | * | 2/1992 | Bernt et al. | 228/138 |
| 5,248,080 A | * | 9/1993 | Stapleton | 228/175 |
| 5,254,835 A | * | 10/1993 | Dalke et al. | 219/125.11 |
| 5,348,212 A | * | 9/1994 | Galanes | 228/135 |
| 5,479,704 A | * | 1/1996 | Richter et al. | 29/889.1 |
| 5,578,227 A | | 11/1996 | Rabinovich | |
| 5,971,252 A | * | 10/1999 | Rosen et al. | 228/112.1 |
| 5,975,406 A | * | 11/1999 | Mahoney et al. | 228/112.1 |
| 6,131,800 A | * | 10/2000 | Fernihough et al. | 228/212 |

(Continued)

FOREIGN PATENT DOCUMENTS

JP 356021736 A * 2/1981

(Continued)

*Primary Examiner*—Samuel M Heinrich
(74) *Attorney, Agent, or Firm*—James Creighton Wray; Meera P. Narasimhan

(57) ABSTRACT

The present invention is a low heat energy input repair system. The system utilizes a V-shaped feedstock that conforms to the shape of grooves in damaged parts. The V-shape of the feedstock conforms closely to the damaged region of various components and reduces the heat input needed to bond the surfaces. The repair system is deployable onsite, at a military depot, industrial manufacturing facility or other location where a mobile repair system would be beneficial. The present system provides onsite, in-situ, low heat input repair of wear, fatigue and corrosion cracks, or impact surface damage of large components. The present invention is particularly useful for components with thin walls and results in low distortion.

9 Claims, 4 Drawing Sheets

U.S. PATENT DOCUMENTS

| | | |
|---|---|---|
| 6,144,008 A | 11/2000 | Rabinovich |
| 6,199,746 B1 * | 3/2001 | Dupree et al. ............... 228/119 |
| 6,230,958 B1 * | 5/2001 | Coletta et al. ............ 228/114.5 |
| 6,441,338 B1 | 8/2002 | Rabinovich |
| 6,454,156 B1 * | 9/2002 | Taras et al. ................. 228/165 |
| 6,793,003 B2 * | 9/2004 | Triantopoulos et al. ..... 164/349 |
| 6,800,829 B1 * | 10/2004 | Nimmons ............... 219/69.17 |
| 6,814,544 B2 * | 11/2004 | Tsukamoto et al. ....... 416/96 R |
| 6,884,964 B2 * | 4/2005 | Murphy ................. 219/137 R |
| 2003/0192941 A1 * | 10/2003 | Ishida et al. ............. 228/112.1 |

FOREIGN PATENT DOCUMENTS

| | | | |
|---|---|---|---|
| JP | 401228698 A | * | 9/1989 |
| JP | 402092479 A | * | 4/1990 |
| JP | 403142085 A | * | 6/1991 |
| JP | 11121906 A | * | 4/1999 |

* cited by examiner

REPAIR WITH FEEDSTOCK HAVING CONFORMING SURFACES WITH A SUBSTRATE

BACKGROUND OF THE INVENTION

Existing metal deposition processes have many flaws that limit efficiency and ease of use. Current processes create molten pools of metal in order to fuse metals together. In order to create a molten pool of metal, extremely high heat and energy inputs are required. Current processes also result in unsatisfactory metallurgic properties and distortion problems.

Traditional repair techniques for land, sea and air vehicles generally require extensive work involving dismantling the equipment and removing structural components for inspection and repair in depot facilities. In many instances, the removal of damaged components adds significantly to the cost and lead-time of the repair.

Current powder or round wire laser metal deposition repair techniques do not allow for in-situ repair of wear, fatigue cracks, or corrosion surface damage of large components, particularly components with thin wall structures or where repair is needed on vertical or overhead surfaces. Additionally, conventional repair processes, like welding or electroplating, are unacceptable on thin wall structures due to excessive distortion that limits the life duration of the repair. These conventional repair processes also can be time-consuming and expensive to perform.

There is a need for equipment with in-situ repair capabilities. In-situ repair dramatically reduces the amount of time needed to repair and replace critical components and reduces recurring repair costs. The armed forces, in particular, have a need for repairs in-place on ships, submarines and aircraft in order to improve support and readiness.

Needs exist for improved methods for metal deposition that have reduced energy input requirements and limited distortion problems, and can be operated in-situ.

SUMMARY OF THE INVENTION

The present invention is a low heat energy input repair system. The repair system utilizes a V-shaped feedstock that eliminates difficulties associated with flat feedstocks. The V-shaped feedstock is particularly useful for repairing cracks in a thin substrate. This advantage arises because of the simultaneous contact of the feedstock with the substrate's V-shaped walls and effective conductance of the heat flux from the top surface to the sides of the V-shaped groove.

U.S. Pat. Nos. 5,578,227, 6,144,008 and 6,441,338 are incorporated by reference as showing, among other things, the depositing, unrolling and heating of continuous wire.

The V-shaped feedstock is better than a flat wire because when a flat wire is placed between two previous passes, the best contact is at the bottom of the flat wire and the substrate as well as at one side of the flat wire with the adjacent pass. However, with a flat wire, there is always some gap between the other side of the rectangular wire and the previous pass. This gap can result in porosity in the form of entrapped gas bubbles after the butt weld of all adjacent wires. The V-shaped feedstock significantly reduces this issue. The space is filled without any gap on either side of the V-shaped groove.

The repair system of the present invention is deployable onsite, at a military depot, industrial manufacturing facility or other location where a mobile repair system would be beneficial. The present system provides onsite, in-situ, low heat input repair of wear, fatigue and corrosion cracks, or impact surface damage of large components. The present invention is particularly useful for components with thin walls. The repair system also results in low distortion repairs. The current invention is able to function on curved, vertical, or overhead surfaces with a multi-axis motion robot.

An important aspect of the present invention is the mobility of the system and the ability to perform in-situ repairs and manufacturing. This is useful for situations where the damaged components are either to large to be feasibly moved to a repair site or too expensive to remove and transport. In-situ repair of ship, submarine or aircraft frame and engine components is made easier. Parts, such as cracked thin metal panels, compressors, turbines, afterburner cases, etc., are repaired more easily. Additionally, components made from a variety of metals, such as alloys of nickel, titanium and aluminum, can be repaired. The system of the present invention is useful for repairs, cladding, fabrication, or reinforcement of damaged metal components.

The present invention repairs complex three-dimensional metal parts with a metal additive fabrication process that results in an order of magnitude or less heat input when compared to existing technologies. Materials deposited by the present invention have very low substrate dilution, thus providing a superior method of corrosion control in applications that are corrosion sensitive. The present invention results in minimal part distortion and superior metallurgic characteristics. The energy consumption and operational costs are also reduced when compared with traditional metal deposition processes.

The present system is capable of operating on a wide variety of complex geometries, including vertical or overhead surfaces. The repair system can be integrated into a multi-axis motion robot with vision-guided line tracking software and repair path teaching capabilities.

Milling and grinding capabilities allow the user to perform a variety of repair related activities in one process and system. Repair operations include repair area preparation, metal deposition and the requisite post-deposition finishing.

The present invention allows for the repair of critical components in areas where conventional powder metal deposition procedures have been deficient due to excessive heat, cracking and/or distortion.

These and further and other objects and features of the invention are apparent in the disclosure, which includes the above and ongoing written specification, with the claims and the drawings.

DETAILED DESCRIPTION OF THE PREFERRED EMBODIMENTS

The present invention is a low heat energy input repair system. The repair system utilizes a V-shaped feedstock that eliminates difficulties associated with flat feedstocks. The repair system is also mobile so that it can be moved to the site where the damaged component is located, eliminating the time and effort needed to dismantle and ship large components.

Figure 1:
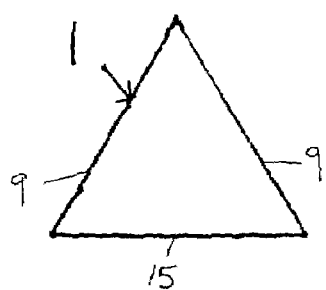
FIG. 1 is a cross-section of the V-shaped feedstock.

The V-shaped feedstock 1, shown in FIG. 1, is particularly useful for repairing cracks in thin substrates. In preferred embodiments, a crack is prepared before repair by grinding a V-shaped groove along the crack.

Figure 2:
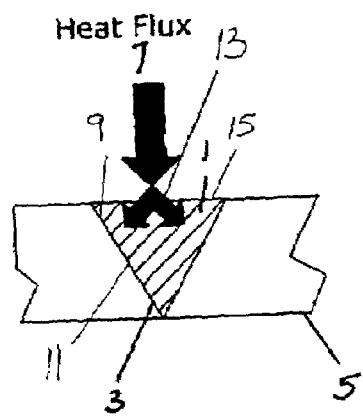
FIG. 2 is a cross-section of a single pass repair using the V-shaped feedstock.

FIG. 2 shows a cross-section of a groove 3 in a substrate 5. A V-shaped feedstock 1 is placed in the crack or in the prepared V-shaped groove 3, and heat 7 is applied to the feedstock 1. The heat is transferred to the contact points between the feedstock 1 and the substrate 5. One advantage of the V-shaped feedstock 1 over flat wires arises through the simultaneous contact of sloped walls 9 of the feedstock 1 with the V-shaped walls 11 of the groove 3 in substrate 5. Effective conductance 13 of the heat flux 7 flows from the back surface 15 to the sides of the V-shaped groove 3.

Figure 3:
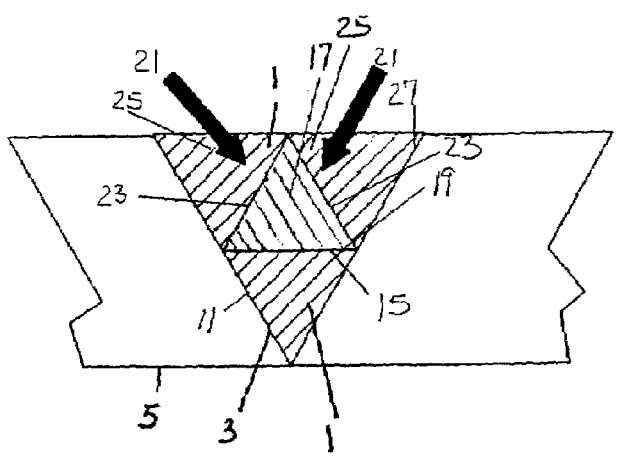
FIG. 3 is a cross-section of a multi-pass, multi-layer repair using the V-shaped feedstock.

FIG. 3 shows a multiple layer application of V-shaped feedstock 1 utilizing a multiple pass system for repair. A relatively thick substrate 5 has a large groove 3 that is first filled with an initial pass of feedstock 1. Additional layers of feedstock 1 are then added above and welded or bonded with heat 7 to the original feedstock 1 and the substrate 5.

The feedstock 17 in the second layer is inverted, with its back 19 placed against the back 15 of the first layer feedstock 1. Alternatively, when a multiple layer repair is needed, the feedstock 1 can have a double V-shape, or a diamond shape. The energy for fusion, in this case, will be directed along the surfaces of contact of the diamond shape in contact with the substrate 5. As the second layer is placed in position, energy from a split beam 21 impinges on the sloped surfaces 23 of the second V-shaped feedstock 17. The energy is conducted to the flat surfaces, and surfaces 15 and 19 soften and fuse.

The V-shaped feedstocks 25 are individually applied with a single beam 7 or are applied in pair with a split beam 21. Sloping side surfaces 27 contact surface 11 of the groove and side surfaces 23 of the second layer 17 and the sloping surfaces soften and fuse.

Alternatively, feedstocks 17 and 1 may be applied simultaneously, with split beams 21 softening and fusing all of the sloping surfaces 23, 27 and the contacting part of surface 11, while also softening and fusing back surfaces 15 and 19.

The V-shaped feedstock 1 is better than a flat wire, because when a flat wire is placed between two previous passes, the best contact is at the bottom of the flat wire and the substrate, as well as at one side of the flat wire with the adjacent pass. However, with a flat wire, there is always some gap between the other side of the rectangular wire and the previous pass. This gap can result in porosity in the form of entrapped gas bubbles after the butt weld of all adjacent wires. The V-shaped feedstock 1 significantly reduces this issue. The space is filled without any gap on either side of the V-shaped groove 3.

Figure 4:
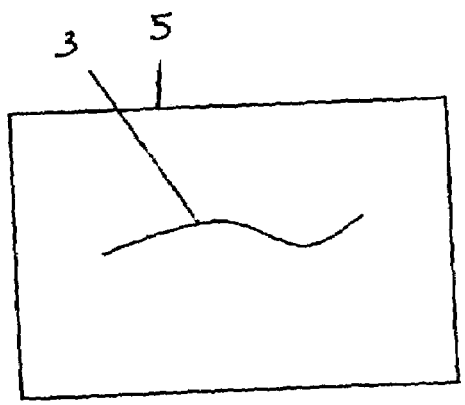
FIG. 4 is a top view of damage repair of a crack.

FIG. 4 shows a top view of a groove 3 in a substrate 5 that can be repaired using a V-shaped feedstock 1.

Figure 5:
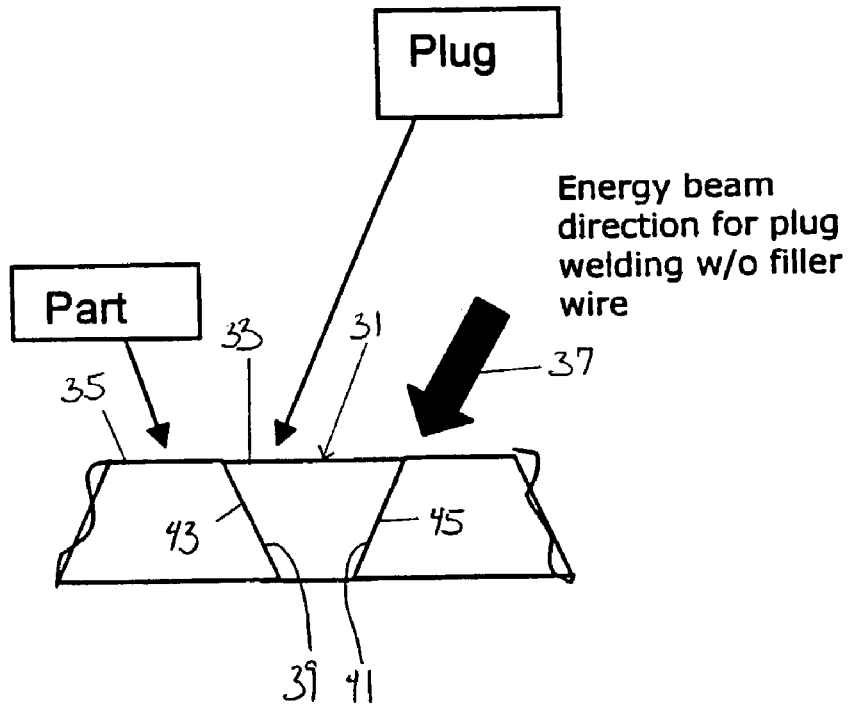
FIG. 5 is a cross-section of a damaged part repair with a plug and the part having tapered conforming surfaces.

FIG. 5 is a cross-section of a damaged part 35 repaired with a plug 31. The part 35 has tapered conforming surfaces that match the part 31. There are many instances where repair of a damaged part 35 can be produced with a tapered shape plug 31 and conforming surface hole. The result is a tight fit without any gap that allows for a low energy weld 37 without adding any filler material. The plug 31 fits into part 35. The energy beam 37 is directed onto a back 33 of the plug 31. Preferably, the energy beam 37 would be directed along the contacting surfaces of the plug 31 and part 35. Heat is transferred to sloped surfaces of the plug 39, 41 that contact sloped surfaces of the part 43, 45. The contacting surfaces soften and fuse. Any excess material from the plug 31 is then removed after the welding.

Figure 6:
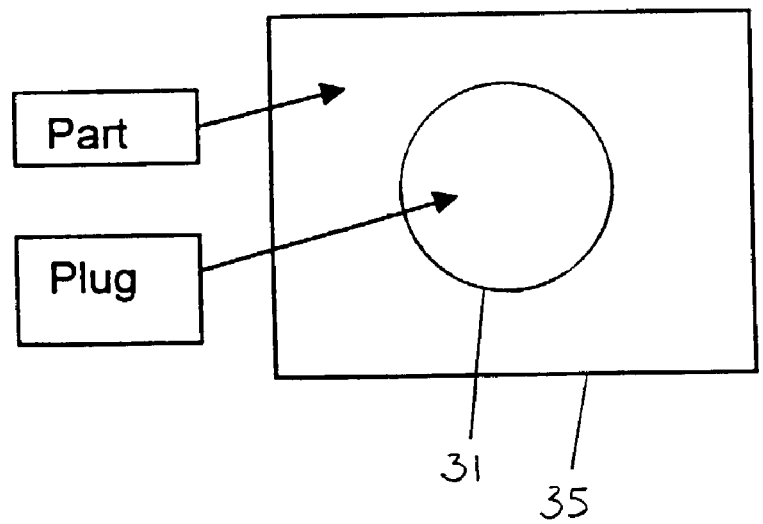
FIG. 6 is a top view of damage repair using a conforming plug.

FIG. 6 is a top view of damage repair using a conforming plug 31. Conventionally, straight wall plugs or covers are used to fix this type of damage. A filler material is then placed in the gaps to produce a solid metal to metal connection. A minimal gap is needed to provide for a porosity-free low energy laser weld. Generally, making a straight wall cover that fits perfectly into the hole is not practical. Therefore, using a tapered plug 31 or cover in placed in a conforming taper hole produces a tight no gap circumferential contact and a better weld.

Additionally, the taper counteracts slight inaccuracies in the dimension of the parts. If the actual dimension of the dimension of the hole is too large, the tapered plug sinks deeper into the hole than nominal. If the actual dimension of the hole is too small, the weld will protrude above the part higher than nominal and excess material then can be removed after the welding.

The minimal heat input of the present invention results in better metallurgy and less distortion than previous methods.

The repair system is deployable onsite, at a military depot, industrial manufacturing facility or other location where a mobile repair system would be beneficial. The present system provides onsite, in-situ, low heat input repair of wear, fatigue and corrosion cracks, or impact surface damage of large components. The present invention is particularly useful for components with thin walls, because it results in low distortion repairs. The current invention also functions on curved, vertical, or overhead surfaces with a multi-axis motion robotic manipulator.

The present invention is useful for situations where the damaged components are either too large to be feasibly moved to a repair site or too expensive to remove and transport. In-situ repair of ships, submarines or aircraft surfaces and frames and engine components is made easier. Parts, such as cracked thin metal panels, compressors, turbines, afterburner cases, etc., could all be repaired more easily. Additionally, components made from a variety of metals, such as alloys of nickel, titanium and aluminum, could be repaired. The system of the present invention is used for repairs, cladding, fabrication, or reinforcement of damaged metal components.

Figure 7:
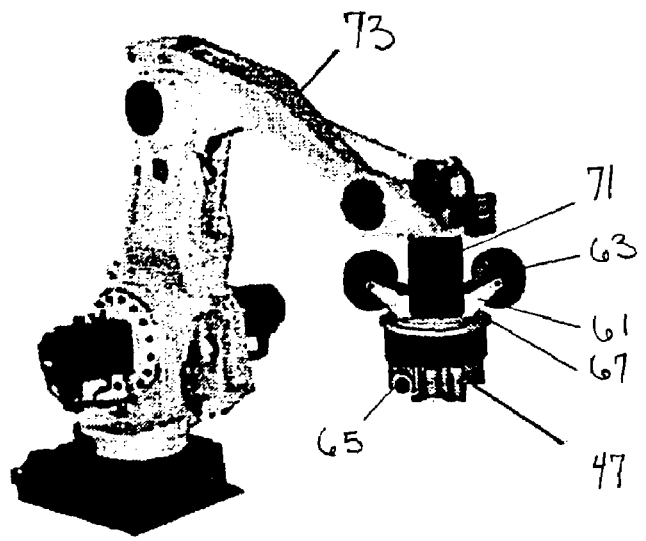
FIG. 7 is a diagram of an articulated and robot for coarse head positioning.

FIG. 7 is a diagram of an articulated arm robot 73, with a repair system head 47 installed. The robotic manipulator 73 moves with six degrees of freedom to align repair system head 47 perpendicular to the surface under repair. In the case of welding sloped wall plugs, the head 47 is maintained in axial alignment with the sloped wall of the plug and the sloping wall of the opening.

The head may be used without the feedstock when anchoring a sloped wall plug in a sloping wall of an opening. When a feedstock is used, feeder 61 supports reels 63 that hold V-shaped wire feedstock. A feedstock delivery system 65 directs the feedstock or feedstocks directly below the beam or split beam from laser beam director 71. Collar 67 supports the feedstock spools 61, 63 for rotation around the laser beam director, so that the feedstock is always aligned with the crack or opening as the feedstock is forced into the opening by the feedstock delivery system 65 and as it has its sloped side walls fused with sidewalls of the opening.

Figure 8:
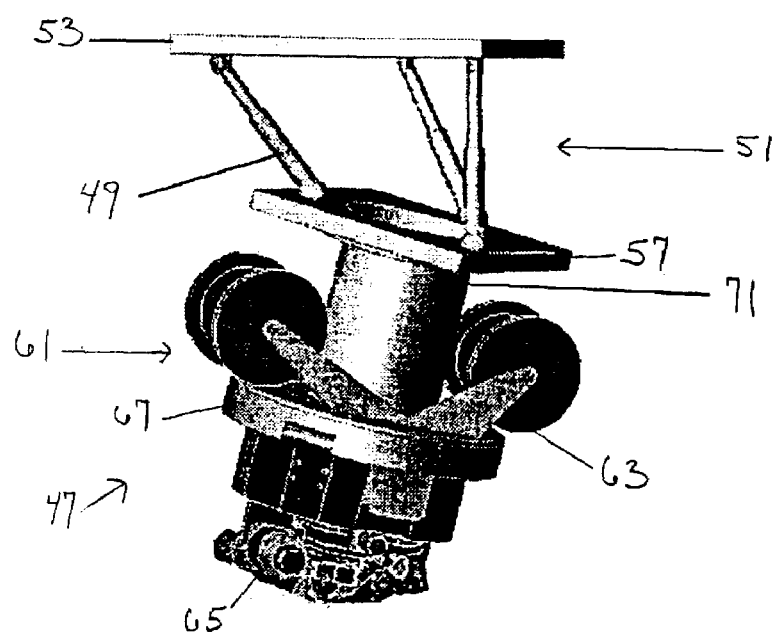
FIG. 8 is a diagram of an applicator head installed on a six degree of freedom parallel manipulator.

FIG. 8 shows the repair system 47 of the present invention mounted on a six-degree of freedom fine manipulator 51. Base 53 is attached to the "hand" of the robotic manipulator 73, as seen in FIG. 7, which roughly aligns the head with a surface that is undergoing repair. Precisely positioned element 57 carries the laser beam director 71, and feeder 61 rotates with collar 67 around the beam director 71. The manipulator 51 has multiple actuators 49 that, by expanding or contracting, allow the repair system head 47 to follow a three-dimensional pass for repairs. During the pass, the deposition/machining head and the laser axis are maintained perpendicular to the three-dimensional surface that is being repaired or fabricated.

This six-degree of freedom manipulator, also called a Stewart platform manipulator, is significantly more accurate and more rigid than conventional multi-axis open chain serial manipulators, such as those shown in FIG. 7. The repair system head 47, in FIG. 8, performs the X, Y and Z plane movements as well as the head rotary movement around the laser beam. This is different than conventional systems where the head component is stationary. For some large conical or cylindrical components, the repair system 47 would have an additional rotary axis about its center to allow the generation of a deposition pattern around the part circumference.

Figure 9:
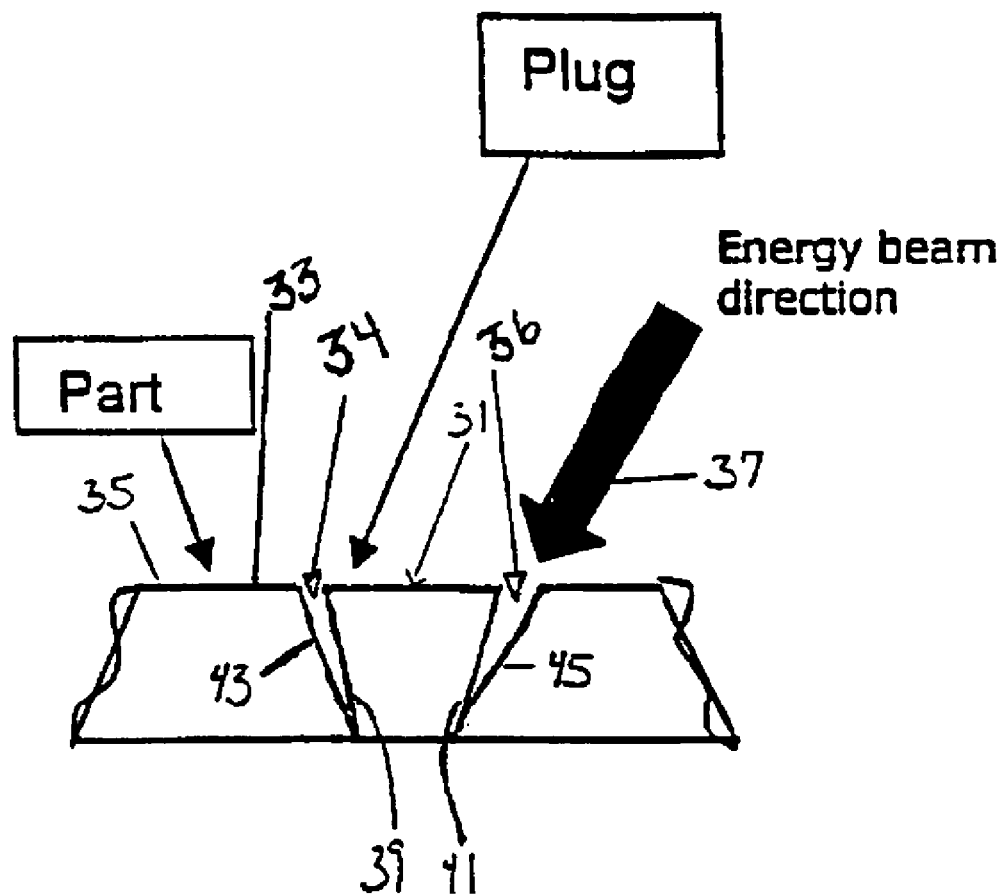
FIG. 9 is a cross-section of a damaged part repair with a plug and V-shaped feedstock in combination.

FIG. 9 shows a damaged part 35 to be repaired with a plug 31, similar to what is shown in FIG. 5. Sloping walls 43, 45 of the hole are prepared. Plug 31, with sloping side walls 39, 41, is prepared for filling the hole, and is laced in the hole. V-shaped feedstock 34, 36 is inserted between the sloping side walls 43, 45 of the hole and the plug 31. No filler material is added. The feedstock 34, 36 is heated, softening and fusing contacting walls of the feedstock 34, 36, hole and plug 31.

While the invention has been described with reference to specific embodiments, modifications and variations of the invention may be constructed without departing from the scope of the invention, which is defined in the following claims.

The invention claimed is:

1. A repairing process for repairing a substrate comprising:
providing a V-shaped feedstock having a back and opposite inwardly sloped side walls,
feeding the V-shaped feedstock into a substrate in need of repair,
heating the V-shaped feedstock by directing energy to the back of the feedstock,
conducting energy through the feedstock, and
fusing the sloped side walls of the feedstock and sloped side walls in a substrate with the conducted energy,
further comprising repairing and filling an opening in a substrate by initially preparing sloping side walls of the opening,
preparing a plug with sloped side walls for filling the opening,
placing the plug in the opening,
inserting the V-shaped feedstock between the plug and sloping side walls of the opening, and
heating and fusing the side walls of the V-shaped feedstock with the sloped side walls of the plug and the sloping side walls of the opening.

2. A repairing process for repairing a substrate comprising:
providing a V-shaped feedstock having a back and opposite inwardly sloped side walls,
feeding the V-shaped feedstock into a substrate in need of repair,
heating the V-shaped feedstock by directing energy to the back of the feedstock,
conducting energy through the feedstock, and
fusing the sloped side walls of the feedstock and sloped side walls in a substrate with the conducted energy,
further comprising placing a second inverted V-shaped feedstock in the substrate in contact with the first V-shaped feedstock and fusing at least one wall of the second V-shaped feedstock to a wall of the first feedstock.

3. The process of claim 2, wherein the second inverted feedstock has a back in contact with the back of the first feedstock and further comprising applying energy through the sloped side walls of the inverted second V-shaped feedstock and conducting the energy through the second V-shaped feedstock and heating and fusing the contacting backs of the first and second feedstocks.

4. The process of claim 3, further comprising placing a third layer of V-shaped feedstocks with sloped side walls contacting with the sloping walls of the substrate and contacting the sloped walls of the second inverted V-shaped feedstock and directing energy into backs of and through the V-shaped feedstocks in the third layer, heating the contacting side walls of the substrate and of the second and third layer feedstocks and fusing the contacting side walls.

5. The process of claim 4, wherein feedstock is added, heated and fused until the last layer of feedstock fills the surface of the substrate.

6. The process of claim 1, further comprising feeding the V-shaped feedstock with a feedstock feeding and energy directing rotatable head and moving the head toward and away from, forward and back and side-to-side with respect to the substrate and rotating the head with respect to the substrate for aligning the feedstock tangentially with a repair while directing energy perpendicularly to a surface of the feedstock while the feedstock is in contact with the substrate.

7. The process of claim 6, further comprising moving the feeding and energy directing rotatable head with a robotic manipulator.

8. The process of claim 7, further comprising fine adjusting the head with a platform having multiple actuators interposed between the robotic manipulator and the head.

9. A method of repairing large substrates, vehicles or building parts comprising:
providing a component with a surface hole,
providing a tapered-shaped plug conforming to the surface hole of the substrate,
inserting the tapered-shaped plug into the surface hole, and
applying heating energy and bonding the tapered-shaped plug in the substrate,
wherein the hole and the plug are non-semispherical in shape,
further comprising inserting a V-shaped feedstock between the hole and the plug, heating the feedstock and softening and fusing contacting walls of the feedstock, hole and plug wherein no gap filler material is required.

* * * * *